Patented Oct. 19, 1954

2,692,254

UNITED STATES PATENT OFFICE 2,692,254

POLYMERIC PRODUCTS FROM CYCLO-PENTADIENE AND A CHLORACETIC ACID

Albert Wassermann, London, England

No Drawing. Application January 29, 1952, Serial No. 268,918

Claims priority, application Great Britain February 5, 1951

12 Claims. (Cl. 260—78.4)

This invention relates to adducts of chloroacetic acids with cyclopentadiene, to derivatives of such adducts, and to processes for the production of the adducts and their derivatives.

The invention comprises chloroacetic-polycyclopentadiene adducts produced by polymerizing cyclopentadiene in the presence of a chloroacetic acid.

The adducts of the invention have a mean molecular weight of from 500 to 2,000.

The invention also consists in a process for the production of the adducts referred to above, in which the monomer is polymerized in solution in an aprotic solvent by being subjected to the action of a chloroacetic acid, dissolved in the solution in a concentration of at least 0.1 g. mol per litre of the solution. Preferably the aprotic solvent is a non-polar solvent.

The initial concentration of the monomers in the solution should be between 0.1 and 3 g. mols per litre, preferably between 0.5 and 3 g. mols per litre, and that of the acid should be between 0.1 and 2.5 g. mols per litre, preferably between 1 and 2 g. mols per litre.

The process may be carried out at low temperatures, e. g. room temperature or at higher temperatures, sufficient pressure being applied to keep the reaction mixture in the liquid phase. Polymerization is effected more rapidly at the higher temperatures but temperatures in excess of 100° C. should in general be avoided since the adduct may become modified at higher temperatures and lose some of its useful properties.

Non-polar solvents which have been found suitable for use in the process of the invention are the paraffinic hydrocarbons, aromatic hydrocarbons, carbon tetrachloride, and carbon disulphide. Suitable aprotic polar solvents include nitrobenzene, nitromethane, chlorinated benzene derivatives, chloroform, and chloroethanes.

Where the product is insoluble in the solvent used, as is the case when cyclopentadiene is polymerized in the presence of trichloroacetic acid using a paraffinic hydrocarbon as solvent, the product precipitates out as the reaction proceeds and may readily be isolated. On the other hand, where both the reactants and the product are soluble in the solvent used, the product may be separated by evaporation of the solvent or by precipitation by the addition of a non-solvent such as ethyl alcohol, acetone or ether.

In one particularly valuable form of the invention the adducts are chloroacetic acid-polycyclopentadiene products which may be represented by the formula:

$$(C_5H_6)_r HOOCCCl_3$$

or $$(C_5H_6)_r HOOCCHCl_2$$

or $$(C_5H_6)_r HOOCCH_2Cl$$

where $r$, the number average of the degree of polymerization, is from 16 to 20. The symbols $HOOCCCl_3$, $HOOCCHCl_2$ and $HOOCCH_2Cl$ do not indicate the presence of free carboxyl groups.

The adducts of the invention are characteristically deep brown-red in colour, soluble in aromatic hydrocarbons but insoluble in alcohol, acetone or water, and will readily take up oxygen. They do not act as carboxylic acids and are incapable of forming salts.

The invention also consists in derivatives of the adducts referred to above obtained by reacting the adduct with maleic anhydride, nitric acid, sulphur, or alcoholic caustic alkali.

Reaction of the adduct with maleic anhydride should be effected at a temperature of from 100° C. to 250° C. under a pressure sufficient to maintain the reactants in the liquid phase, to bring about addition of a maleic anhydride unit to each repeating unit of the hydrocarbon polymer, the resulting adduct being chlorine free. Thus by reacting a chloroacetic acid-polycyclopentadiene adduct in a closed reaction vessel with maleic anhydride at a temperature of from 150 to 160° C. there is formed a chlorine-free polymer, the repeating unit of which may be represented by $[(C_5H_6)(C_4H_2O_3)]$.

The maleic anhydride reaction products will readily take up water to give maleic acid reaction products. Thus hydration of the product formed by reacting a chloroacetic acid-polycyclopentadiene adduct with maleic anhydride as described above, yields a chlorine-free polymer, the repeating unit of which may be represented by $[(C_5H_6)(C_4H_4O_4)]$. Such a polymer is capable of forming salts, the sodium or potassium salts being water soluble, while the calcium, barium, and copper salts are insoluble in water.

Reaction of the adducts with concentrated nitric acid at a temperature of from 100 to 160° C. and under a pressure sufficient to maintain the reaction mixture in the liquid phase brings about the addition of at least two oxygen atoms to each repeating unit of the resulting hydrocarbon polymer. When a chloroacetic acid-polycyclopentadiene adduct is reacted with concentrated nitric acid at a temperature of 100° C., there is formed a chlorine-free polymer, the repeating unit of which may be represented by the formula ($C_5H_4O_3$).

The reactions of the adducts of the invention with maleic anhydride and nitric acid, which are described above, show that the adducts are highly unsaturated, i. e. they contain substantially one olefinic double bond per repeating unit.

Reaction between the adducts and sulphur may be effected either by heating the adducts with elemental sulphur or by subjecting the heated adduct in film form to vapours containing sulphuretted hydrogen or similarly reactive sulphur compounds.

The chloroacetic acid-polymeric hydrocarbon adducts of the invention may be converted to chlorine-free hydrocarbon polymers by reaction with caustic alkali in the presence of a lower aliphatic alcohol as diluent.

The adducts of the invention and their derivatives are suitable for use in plastic, impregnating or coating compositions, or as emulsifiers.

In the examples which follow:

Examples 1 to 7 illustrate the production of chloroacetic acid-polycyclopentadiene adducts in accordance with my invention.

Example 8 shows the production of trichloroacetic acid-polybutadiene adducts and is included for purposes of comparison.

Examples 9 to 11 which also are included for comparison show the production of chloroacetic acid-polymeric hydrocarbon adducts by subjecting a prebenzene fraction to the action of a chloroacetic acid.

Examples 12 to 18 illustrate the production of derivatives of chloroacetic acid-polycyclopentadiene adducts, and the reactions and uses of the adducts and their derivatives, and Examples 19 to 22 illustrate for comparison the reactions and uses of chloroacetic acid-polymeric hydrocarbon adducts produced by subjecting a prebenzene fraction to the action of a chloroacetic acid, and also the production, properties, and uses of derivatives of these adducts.

Example 1

Cyclopentadiene and trichloroacetic acid were dissolved in benzene, the concentration being adjusted in such manner that the reaction mixture contained 1.7 g. mols. of cyclopentadiene and 1.1 g. mols. of trichloroacetic acid per litre of solution. The solution was allowed to stand at 25° C. for about three hours, after which it was added to 4 times its volume of ethyl alcohol. This resulted in the precipitation of a gel which was separated from the bulk of the solution. The precipitate was washed with ethyl alcohol and dried in vacuo. The analysis and the properties of this product showed it to be a trichloroacetic acid-polycyclopentadiene adduct, represented by the formula ($C_5H_6$)$_r$.HOOC.CCl$_3$, where $r$, the number average degree of polymerisation, had a value of about 16. The weight of the dried product showed that 90% of the cyclopentadiene initially employed had been converted.

Example 2

Cyclopentadiene and trichloroacetic acid were dissolved in benzene, the concentrations being adjusted in such manner that the reaction mixture contained 0.56 g. mol. of cyclopentadiene and 1.1 g. mols. of trichloroacetic acid per litre of solution. After keeping the solution for 3 hours at 18° C., it was found that 85% of the cyclopentadiene had been converted into an adduct of a composition similar to that of the product obtained in Example 1.

Example 3

Cyclopentadiene and trichloroacetic acid were dissolved in carbon tetrachloride, the concentrations being adjusted in such manner that the reaction mixture contained 1.7 g. mols. of cyclopentadiene and 1.0 g. mol. of trichloroacetic acid per litre of solution. The solution was kept at about 18° C. for 2 hours. It was then found that over 80% of the cyclopentadiene had been converted into an adduct of a composition similar to that of the product of Example 1.

Example 4

Cyclopentadiene and trichloroacetic acid were dissolved in carbon tetrachloride, the concentrations being adjusted in such manner that the reaction mixture contained 2.7 g. mols. cyclopentadiene and 1.0 g. mol. of trichloroacetic acid per litre of solution. After keeping the solution for about 3 hours at 17° C., it was found that over 80% of the cyclopentadiene had been converted into an adduct of a composition similar to that of the product of Example 1.

Example 5

Cyclopentadiene and trichloroacetic acid were dissolved in benzene, the concentrations being adjusted in such manner that the reaction mixture contained 1 g. mol. of trichloroacetic acid and 1.7 g. mols. of cyclopentadiene per litre of solution. This solution was heated to 80° C. and kept at this temperature for 10 minutes. It was then cooled to room temperature and shaken with a solution of sodium hydroxide in an acetone-water mixture containing about 10-15% of acetone. The amount of sodium hydroxide present in the solution was 1.1 to 1.2 g. mols. per g. mol. of trichloroacetic acid initially dissolved. The shaking or stirring together of the two solutions causes any free trichloroacetic acid, which has not reacted to form an adduct with the cyclopentadiene polymer, to react with the sodium hydroxide to form a sodium salt which is substantially insoluble in benzene but readily soluble in the acetone-water mixture. The trichloroacetic acid-polycyclopentadiene adduct is not capable of forming a sodium salt and is insoluble in the acetone-water mixture. Thus as a result of the shaking or stirring together of the two solutions, two separate layers were formed. The one was an acetone-water layer containing the sodium salt of trichloroacetic acid and the other was a benzene layer containing the trichloroacetic acid-polycyclopentadiene adduct but substantially no free trichloroacetic acid. The adduct was precipitated from its solution as described in Example 1. Alternatively the adduct may be isolated as a solid residue by removing the benzene by evaporation. The composition of the adduct was similar to that of the adduct obtained in Example 1.

The process outlined in this example may be modified as follows:

The acetone may be replaced by other water soluble organic solvents, for instance methyl alcohol, ethyl alcohol, butanol or dioxane, and the

Example 6

Cyclopentadiene and dichloroacetic acid were dissolved in benzene, the concentrations being adjusted in such manner that the reaction mixture contained 0.56 g. mol. of cyclopentadiene and 1.1 g. mols. of dichloroacetic acid per litre of solution. The solution was kept at 25° C. until over 30% of the cyclopentadiene had been converted into an adduct which was precipitated as described in Example 1. The composition of the product corresponded to the formula $$(C_5H_6)r.HOOC.CHCl_2$$

where $r$, the number average of the degree of polymerisation is about 16.

Example 7

Cyclopentadiene and monochloroacetic acid were dissolved in benzene, the concentrations being adjusted in such manner that the reaction mixture contained 0.56 g. mol. of cyclopentadiene and 1.40 g. mols. of monochloroacetic acid per litre of solution. The reaction mixture was kept at room temperature until the reaction was substantially complete. The free mono-choloroacetic acid, which had not reacted with the cyclopentadiene, was then removed by the method described in Example 5. The product of the reaction was an adduct the composition of which corresponded to the formula $(C_5H_6)r.HOOC.CH_2Cl$, where $r$, the number average of the degree of polymerization, is about 20.

Example 8

1700 cc. of a benzene solution containing 1.3 g. mols. of trichloroacetic acid and 4.5 g. mols. of 1,3-butadiene were kept in a closed reaction vessel until the solution had become dark brown, almost black. The reaction mixture was then stirred for one hour with three litres of water containing 2 g. mols. of sodium bicarbonate, in order to convert the trichloroacetic acid which had not reacted into the sodium salt, which is practically insoluble in benzene but easily soluble in water. After separating off the aqueous layer, the benzene solution was dried by contact with anhydrous sodium sulphate, and the clear solution was then distilled. There remained 20 gms. of a deep brown, almost black residue after distilling off material volatile at 108° C. under a pressure of 31 mm. Hg. This residue was a trichloroacetic acid-polybutadiene adduct easily soluble in benzene, carbon tetrachloride or chloroform but practically insoluble in water or ethyl alcohol. The adduct was a moderately viscous liquid at room temperature, thickening to a more highly viscous liquid at 0° C. Upon shaking a carbon tetrachloride solution of the adduct with water, a stable, stiff emulsion was formed.

In Examples 9 to 11 which follow, a pre-benzene fraction was used which had been obtained by distillation from the aromatic liquid product derived from a cracking and aromatisation process. The fraction had a specific gravity of about 0.7, and contained a mixture of mono- and di-olefins having 4–6 carbon atoms comprising approximately 37.5% by weight noncyclic mono-olefins, mainly 3-methyl butene-1, 2-methyl butene-1, pentene-1 and pentene-2; 2.5% by weight cyclic mono-olefins, mainly cyclo-pentene; 36% by weight non-cyclic diolefins, mainly isoprene, trans-piperylene, cis-piperylene and dimethylbutadiene-1,3; and 24% by weight cyclic di-olefins, mainly cyclopentadiene. The remainder of the pre-benzene fraction was mainly benzene, present in an amount by weight of approximately 30%. All parts and percentages in Examples 9 to 11 are by weight.

Example 9

80 parts of trichloroacetic acid were dissolved in 280 parts of the pre-benzene fraction and the solution was left to stand at room temperature for one day. At the end of this time 2000 parts of ethanol were added to the reaction mixture which was dark blue, and this resulted in the precipitation of 30 parts of a trichloroacetic acid adduct in the form of a dark, reddish brown, paste-like material of mean molecular weight of about 1000. The trichloroacetic acid which remained in solution was recovered by distillation of the solvent.

Example 10

40 parts of trichloroacetic acid were dissolved in 140 parts of the pre-benzene fraction and the solution was left to stand at room temperature for one day. At the end of this time the reaction mixture, which was dark blue, was shaken with 750 parts of an aqueous sodium hydroxide solution having a normality of 1, to convert the trichloroacetic acid into sodium trichloroacetate. There resulted an aqueous phase which contained substantially all the sodium trichloroacetate which had not reacted, and a liquid hydrocarbon phase containing the trichloroacetic acid-polymeric hydrocarbon adduct which had formed. The trichloroacetic acid was recovered by acidification of the aqueous solution of sodium trichloroacetate after the aqueous phase had been separated. The liquid hydrocarbon phase was distilled at atmospheric pressure to yield a colourless liquid of boiling point up to 70° C. and 35 parts of the trichloroacetic acid adduct having a mean molecular weight of about 1000 which was in the form of a dark brown, paste-like material.

Example 11

50 parts of monochloroacetic acid were added to 280 parts of the pre-benzene fraction and the resulting mixture was left to stand for six days at room temperature. At the end of this time 32 parts of the acid which had not dissolved, were removed by filtration. The filtrate, which was dark blue, was shaken with 300 parts of an aqueous solution of sodium hydroxide having a normality of 1, to convert the acid remaining in solution into sodium monochloroacetate. There resulted an aqueous phase which contained in solution substantially all the unreacted monochloroacetic acid in the form of the sodium salt and a liquid hydrocarbon phase containing in solution the monochloroacetic acid-polymeric hydrocarbon adduct which had been formed. The monochloroacetic acid was recovered as in Example 10. The hydrocarbon phase was distilled at atmospheric pressure to yield a colourless fraction of boiling point up to 70° C. and 29 parts of a dark brown, liquid monochloroacetic acid-polymeric hydrocarbon adduct, having a boiling point above 100° C. at 0.1 mm. pressure.

Example 12

2 parts by weight of a trichloroacetic acid-polycyclopentadiene adduct obtained as in Example 1 and 6 parts by weight of maleic anhydride were ground together and heated in a closed reaction vessel for 14 hours to 160° C. After cooling to room temperature the mixture was extracted with dry benzene thereby dissolving maleic anhydride and a small amount of the trichloroacetic acid-polycyclopentadiene adduct which had not reacted. The benzene-insoluble residue (3 parts by weight) was found to be a chlorine-free polymer of average molecular weight 3100, the repeating unit of which may be represented by the formula $[(C_5H_6)(C_4H_2O_3)]$. The addition of a maleic anhydride unit in this fashion to each repeating unit occurs because the trichloroacetic acid-polycyclopentadiene adduct is highly unsaturated i. e. it contains an olefinic double bond per repeating unit. This polymeric product takes up water, thereby being converted into a polymeric product the repeating unit of which can be represented by the formula $[(C_5H_6)(C_4H_4O_4)]$. This last mentioned polymeric product is capable of forming salts, the sodium or potassium salt being water soluble, while the calcium, barium and copper salts are insoluble in water.

Example 13

5 parts by weight of a trichloroacetic acid-polycyclopentadiene adduct obtained as in Example 1 were heated for 12 hours at 100° C. with 300 parts by weight of a concentrated solution of nitric acid in water (spec. gr. 1.54 at 0° C.). After evaporating off the nitric acid and the water at about 100° C. a solid residue remained in the reaction vessel (4 parts by weight), which was found to be a polymeric oxidation product of average molecular weight 680, the repeating unit being $(C_5H_4O_3)$. This polymeric oxidation product is hygroscopic, easily soluble in water, acetone or ethyl alcohol, but practically insoluble in ether or benzene. The fairly viscous solution in water is acid. On neutralizing with sodium or potassium hydroxide no precipitate was formed. The barium or the copper salt, on the other hand, was found to be sparingly soluble in water.

Example 14

To a 20% by weight solution in toluene of a trichloroacetic acid-polycyclopentadiene adduct obtained as in Example 1 was added 5% by weight of sulphur calculated on the weight of the adduct. The resulting mixture was applied to sheet metal such as tin plate in such quantities that the final film, after evaporation of the toluene, had the desired thickness, i. e. a thickness equivalent to 2 milligrams per square inch of dry film.

The coated sheet, after evaporation of most of the toluene, was placed in an oven and was heated to 150° C. for a period of 1 hour; during this heating period the film took up oxygen from the air without loss of adhesion. A hard tough coating was obtained, which was insoluble in hydrocarbons and possessed good resistance to acids and to weathering.

Example 15

A tin-plated sheet was coated with a 15% by weight solution in toluene of a trichloroacetic acid-polycyclopentadiene adduct as obtained in Example 1, in sufficient quantity to secure a desired final coating weight of about 2 milligrams per square inch after removal of the toluene at an elevated temperature. The coated sheet was introduced for one hour into an oven the temperature of which was about 100° C. while maintaining a flow of hydrogen sulphide through the oven.

The resulting coating was hard, tough and flexible and adhered well to the sheet.

Example 16

A 0.1% by weight solution in benzene of a trichloroacetic acid-polycyclopentadiene adduct obtained as in Example 1 was shaken for 30 seconds with an equal volume of water, thereby emulsifying about one third of the benzene solution. The resulting emulsion was very viscous and was stable at room temperature for many weeks. Similar stable and viscous emulsions may be prepared by shaking 0.1% benzene or carbon-tetrachloride solutions of adducts obtained as in Examples 5, 6 or 7 with water or with aqueous solutions of various inorganic salts, acids or bases.

Example 17

Filter paper was impregnated with a benzene solution of a trichloroacetic-polycyclopentadiene adduct, obtained as in Example 5. After evaporation of the benzene the paper contained 20 mgm. of the adduct per square inch of the paper. The impregnated paper was immersed in water for several hours after which it was found to have absorbed 94% of its weight of water. In a control experiment, in which the filter paper was not impregnated with the adduct, the water absorbed amounted to 280% by weight of the paper. Similar results were obtained with other papers showing the suitability of the adduct as an impregnating agent for reducing absorption of moisture by paper.

Example 18

6.3 g. of a trichloroacetic acid-polycyclopentadiene adduct obtained as in Example 1, were dissolved in 240 g. benzene to which were added 100 g. 0.5 N. ethyl alcoholic potassium hydroxide. The reaction mixture was left for 15 hours at room temperature while bubbling oxygen-free nitrogen through the solution, and was then added to 2500 g. ethyl alcohol, thereby precipitating a chlorine-free polymer the yield of which after drying was 3.4 g.

All parts and percentages in Examples 19 to 22 are by weight.

Example 19

A 20% solution in benzene was made of a trichloroacetic acid-polymeric hydrocarbon adduct obtained as in Example 10. This solution was applied to a sheet of tin-plated metal so that after evaporation of the benzene a uniform coating equivalent to 2 milligrams per square inch remained on the surface of the metal. The coated sheet was dried and placed in an oven at a temperature of 120° C. for 2 hours.

The film produced was hard and tough, adhered well to the metal, had a brown colour and was insoluble in most organic solvents. The film also showed good resistance to acids and bases and to oxidation.

Similar results were obtained with the monochloroacetic acid-polymeric hydrocarbon adduct obtained as in Example 11.

Example 20

A 0.1% carbon tetrachloride solution of a trichloroacetic acid-polymeric hydrocarbon obtained as in Example 10 was shaken for 2 minutes with an equal volume of water, thereby emulsifying about 10% of the carbon tetrachloride. The resulting emulsion was relatively stable at room temperature. Similar emulsions of carbon tetrachloride were prepared in aqueous solutions of sulphuric acid, sodium hydroxide and sodium chloride. Similar results were obtained with an adduct obtained as in Example 11.

Example 21

A solution in benzene of a trichloroacetic acid-polymeric hydrocarbon adduct obtained as in Example 10 was applied to filter paper. After evaporation of the solvent the paper contained 20 mgms. of the adduct per square inch of the paper. The paper was introduced into an oven and heated for 2 hours to 120° C. The coated paper was immersed in water for several hours when it was found to have absorbed about 120% of its dry weight of water. In a control experiment in which the filter paper was not impregnated with the adduct, the water absorbed amounted to 280% of the dry weight of the paper. Similar results were obtained with other papers thereby showing the suitability of this adduct as an impregnating agent for reducing moisture absorption by paper.

Similar results were obtained with an adduct obtained as in Example 11.

Example 22

3 parts of an adduct obtained as in Example 10 were heated with 10 parts of maleic anhydride to 160° C. and kept at that temperature for 12 hours. After cooling to room temperature the resulting material was extracted with benzene, leaving as insoluble residue 5.2 parts of a chlorine-free maleic anhydride-hydrocarbon polymer soluble in acetone and also in an aqueous solution of sodium hydroxide. The amount of maleic anhydride taken up by the adduct shows that the adduct is highly unsaturated and contains substantially one olefinic double bond per repeating unit.

Films produced from this polymeric product had properties similar to those of the film obtained in Example 19.

Products similar to those described in the above examples may be obtained by substituting other halogenoacetic acids, e. g. fluoroacetic acids, for the chloroacetic acids used.

It will be noted from the foregoing examples and disclosure that the polymerization step of my process is conducted in the absence of extraneous catalysts.

I claim:

1. A process for the production of a chloroacetic acid-polymeric hydrocarbon adduct containing substantially one double bond per repeating unit which comprises polymerizing cyclopentadiene by subjecting a solution containing at least 0.1 g. mol per liter of cyclopentadiene in an organic aprotic solvent to the action of a chloroacetic acid dissolved in the solution in a concentration of at least 0.1 g. mol per liter of solution, at a temperature not exceeding 100° C. and under a pressure sufficient to maintain the reaction mixture in the liquid phase and recovering the resulting adduct.

2. The process of claim 1 in which the chloroacetic acid is trichloroacetic acid.

3. The adduct product obtained by the process of claim 2.

4. The process of claim 1 wherein the chloroacetic acid is dichloroacetic acid.

5. The process of claim 1 wherein the chloroacetic acid is monochloroacetic acid.

6. The process of claim 1 in which the solvent is a nonpolar solvent.

7. The process of claim 1 in which the initial concentrations of cyclopentadiene and chloroacetic acid in the solution are respectively from 0.5 to 3. g. mols per liter and from 1 to 2.5 g. mols per liter.

8. The adduct product obtained by the process of claim 1.

9. The process of claim 1 followed by reacting the recovered adduct with maleic anhydride at a temperature of from about 100° to 250° C. and under a pressure at least sufficient to maintain the reaction mixture in the liquid phase, to produce a chlorine-free polymeric product containing a maleic anhydride unit in each repeating unit.

10. The process of claim 9 followed by hydrating the said polymeric product to produce a polymeric product containing a maleic acid unit in each repeating unit.

11. The process of claim 1 followed by reacting the recovered adduct with concentrated nitric acid at a temperature of from about 100° to 160° C. and under a pressure at least sufficient to maintain the reaction mixture in liquid phase, to produce a chlorine-free, oxygen-containing polymeric product.

12. The process of claim 1 followed by reacting the recovered adduct with an alcoholic caustic alkali to produce a chlorine-free polymeric product.

References Cited in the file of this patent

UNITED STATES PATENTS

| Number | Name | Date |
|---|---|---|
| 2,440,800 | Hanford | May 4, 1948 |
| 2,479,490 | Guinot | Aug. 16, 1949 |
| 2,507,568 | Hanford | May 16, 1950 |
| 2,598,263 | Johnson | May 27, 1952 |